United States Patent
Veldten et al.

(10) Patent No.: US 9,593,617 B2
(45) Date of Patent: Mar. 14, 2017

(54) METHOD FOR DIAGNOSING AN EXHAUST GAS CATALYTIC CONVERTER, DIAGNOSIS DEVICE AND MOTOR VEHICLE HAVING SUCH A DEVICE

(71) Applicant: Volkswagen Aktiengesellschaft, Wolfsburg (DE)

(72) Inventors: Burkhard Veldten, Edemissen (DE); Maciej Kulaszewski, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/654,174

(22) PCT Filed: Nov. 21, 2013

(86) PCT No.: PCT/EP2013/074351
§ 371 (c)(1),
(2) Date: Jun. 19, 2015

(87) PCT Pub. No.: WO2014/095215
PCT Pub. Date: Jun. 26, 2014

(65) Prior Publication Data
US 2015/0315951 A1 Nov. 5, 2015

(30) Foreign Application Priority Data
Dec. 20, 2012 (DE) .................. 10 2012 025 002

(51) Int. Cl.
*G01M 17/00* (2006.01)
*G06F 19/00* (2011.01)
(Continued)

(52) U.S. Cl.
CPC .......... *F01N 11/007* (2013.01); *F01N 3/2066* (2013.01); *F01N 11/00* (2013.01);
(Continued)

(58) Field of Classification Search
CPC ...... F01N 11/007; F01N 3/2066; F01N 11/00; F01N 2900/1621; F01N 2560/026;
(Continued)

(56) References Cited

U.S. PATENT DOCUMENTS 5,845,487 A * 12/1998 Fraenkle ............ B01D 53/9431
60/274
6,257,197 B1 * 7/2001 Nishimura .............. F02D 33/00
123/295

(Continued)

FOREIGN PATENT DOCUMENTS

| CN | 1468373 A | 1/2004 |
|---|---|---|
| CN | 10 2224329 A | 10/2011 |

(Continued)

OTHER PUBLICATIONS

International Search Report for PCT International Application No. PCT/EP2013/074351, mailed Feb. 25, 2014.

(Continued)

*Primary Examiner* — Mary Cheung
(74) *Attorney, Agent, or Firm* — Pearl Cohen Zedek Latzer Baratz LLP

(57) ABSTRACT

A method for diagnosing an exhaust-gas catalytic converter (28) arranged in an exhaust-gas system (20) of an internal combustion engine (12) for the catalytic conversion of at least one exhaust-gas component from the internal combustion engine (12), which has an exhaust-gas recirculation means with which a partial stream of the exhaust gas can be drawn off downstream of the catalytic converter (14) and fed into the combustion air of the internal combustion engine (Continued)

(12), involves determining the current raw emission ($NO_x$_raw) of the internal combustion engine (12) in of the exhaust-gas component; measuring the current concentration of the exhaust-gas component ($NO_x$_meas) in the exhaust gas upstream of the catalytic converter (28); and determining a diagnostic value for the catalytic converter (28) in terms of the conversion of the exhaust-gas component as a function of the modelled raw emission ($NO_x$_raw) from the internal combustion engine (12) and the measured concentration of the exhaust-gas component ($NO_x$_meas). The invention further relates to a diagnostic device configured to perform the method and a motor vehicle having such a device.

11 Claims, 2 Drawing Sheets

(51) Int. Cl.
*F01N 11/00* (2006.01)
*F01N 3/20* (2006.01)
*F01N 3/08* (2006.01)
*F01N 3/10* (2006.01)
*F01N 9/00* (2006.01)

(52) U.S. Cl.
CPC ............ *F01N 3/0842* (2013.01); *F01N 3/101* (2013.01); *F01N 3/103* (2013.01); *F01N 9/005* (2013.01); *F01N 2340/02* (2013.01); *F01N 2550/02* (2013.01); *F01N 2560/026* (2013.01); *F01N 2900/0412* (2013.01); *F01N 2900/1402* (2013.01); *F01N 2900/1621* (2013.01); *F02M 26/06* (2016.02); *F02M 26/28* (2016.02); *Y02T 10/22* (2013.01); *Y02T 10/24* (2013.01); *Y02T 10/47* (2013.01)

(58) Field of Classification Search
CPC ............ F01N 2340/02; F01N 2550/02; F01N 2900/0412; F01N 3/103; F01N 9/005; F01N 2900/1402; F01N 3/101; F01N 3/0842; F02M 26/06; F02M 26/28; Y02T 10/22; Y02T 10/47; Y02T 10/24

See application file for complete search history.

(56) References Cited

U.S. PATENT DOCUMENTS

| | | | |
|---|---|---|---|
| 6,843,240 B1 | 1/2005 | Hahn et al. | |
| 6,877,366 B2 | 4/2005 | Rabl | |
| 8,707,935 B2 | 4/2014 | Weber et al. | |
| 2008/0053071 A1* | 3/2008 | Adams | F01N 3/0814 60/286 |
| 2009/0293451 A1 | 12/2009 | Kesse | |
| 2010/0043397 A1 | 2/2010 | Wang et al. | |
| 2010/0107610 A1 | 5/2010 | Schüssler et al. | |
| 2010/0221164 A1* | 9/2010 | Lee | B01D 53/90 423/239.2 |
| 2011/0023855 A1 | 2/2011 | Van Nieuwstadt et al. | |
| 2011/0146269 A1 | 6/2011 | Hepburn et al. | |
| 2012/0233984 A1 | 9/2012 | Levijoki et al. | |
| 2013/0019588 A1* | 1/2013 | Richardson | F01N 3/106 60/274 |

FOREIGN PATENT DOCUMENTS

| | | |
|---|---|---|
| DE | 102 54 477 B3 | 6/2004 |
| DE | 10 2009 037 584 A1 | 4/2010 |
| DE | 10 2010 026 969 A1 | 2/2011 |
| DE | 10 2010 042 442 A1 | 5/2011 |
| JP | 2004 308455 A | 11/2004 |
| WO | WO 2004/046528 A1 | 6/2004 |
| WO | WO 2007/098514 A2 | 9/2007 |
| WO | WO 2009 118622 A1 | 10/2009 |
| WO | WO 2011/075015 A1 | 6/2011 |

OTHER PUBLICATIONS

Search Report for German Patent Application No. 10 2012 025 002.9, mailed Jul. 30, 2013.
Office Action for Chinese Patent Application No. 201380060310.6, mailed Sep. 30, 2016.

* cited by examiner

METHOD FOR DIAGNOSING AN EXHAUST GAS CATALYTIC CONVERTER, DIAGNOSIS DEVICE AND MOTOR VEHICLE HAVING SUCH A DEVICE

CROSS-REFERENCE TO RELATED APPLICATIONS

This application is a National Phase Application of PCT International Application No. PCT/EP2013/074351, International Filing Date Nov. 21, 2013, claiming priority of German Patent Application No. 10 2012 025 002.9, filed Dec. 20, 2012, each of which is hereby incorporated by reference in its entirety.

FIELD OF THE INVENTION

The invention relates to a method for diagnosing an exhaust-gas catalytic converter arranged in the exhaust-gas system of the internal combustion engine for the catalytic conversion of at least one exhaust-gas component of an internal combustion engine; the invention also relates to a diagnostic device that is configured to carry out said method, and to a motor vehicle having such a diagnostic device. In a special embodiment, the exhaust-gas catalytic converter is a catalytic converter that functions according to the principle of selective catalytic reduction for purposes of reducing nitrogen oxide $NO_x$.

BACKGROUND OF THE INVENTION

Internal combustion engines that are operated either constantly or at times with a lean air-fuel mixture produce nitrogen oxides $NO_x$ (mainly $NO_2$ and $NO$), which require $NO_x$-reducing measures. Exhaust-gas recirculation constitutes an engine-related measure aimed at reducing $NO_x$ raw emissions in the exhaust gas, and this is a process in which part of the exhaust gas of the internal combustion engine is recirculated into its combustion air, as a result of which the combustion temperatures are lowered and consequently the formation of $NO_x$ ($NO_x$ raw emission) is reduced. As a rule, however, exhaust-gas recirculation is not sufficient to comply with statutory $NO_x$ limit values, which is why there is an additional need for an active exhaust-gas after-treatment that lowers the $NO_x$ end emission by catalytically reducing $NO_x$ to form nitrogen $N_2$. A known $NO_x$ exhaust-gas after-treatment involves the use of $NO_x$-storage catalytic converters which, during lean operation (with $\lambda > 1$), store nitrogen oxides in the form of nitrates and, at short intervals with a rich exhaust-gas atmosphere ($\lambda < 1$), desorb the stored nitrogen oxides and reduce it to nitrogen $N_2$ in the presence of the reductants present in the rich exhaust gas.

Another approach to convert nitrogen oxides in the exhaust gases of lean-burning internal combustion engines is the use of catalyst systems that operate according to the principle of selective catalytic reduction (SCR). These systems comprise at least one SCR catalytic converter that, in the presence of a reductant metered into the exhaust gas—normally ammonia $NH_3$—selectively convert the nitrogen oxides of the exhaust gas into nitrogen and water. In this context, the ammonia can be metered into the exhaust-gas stream from an aqueous solution of ammonia or from a precursor compound, for instance, urea in the form of an aqueous solution or solid pellets, obtained through the modality of thermolysis and hydrolysis. A more recent approach for ammonia storage in a motor vehicle utilizes the $NH_3$-storage materials that reversibly bind the ammonia as a function of the temperature. In this context, metal-ammine storage materials are well known such as, for example, $MgCl_2$, $CaCl_2$ and $SrCl_2$, which store ammonia in the form of a complex compound so that it is then present, for example, as $MgCl_2(NH_3)_x$, $CaCl_2(NH_3)_x$ or $SrCl_2(NH_3)_x$. The ammonia can once again be released from these compounds by feeding in heat.

It likewise a known procedure to continuously check the proper functioning of exhaust-gas catalytic converters comprising SCR catalytic converters or $NO_x$-storage catalytic converters by means of on-board diagnostics (OBD). Towards this end, the signal of an exhaust-gas sensor ($NO_x$ sensor) located downstream from the catalytic converter is normally employed for the appertaining exhaust-gas component in order to measure the concentration of this exhaust-gas component downstream from the catalytic converter. Furthermore, the concentration of the exhaust-gas component is determined upstream from the catalytic converter, that is to say, the raw emission of the engine. This can be done by measuring the concentration by means of another exhaust-gas sensor installed upstream from the catalytic converter. However, the raw emission is more often ascertained by means of modeling using stored characteristic maps that depict the concentration of the component as a function of the momentary operating point of the internal combustion engine. The efficiency $\eta$ of the exhaust-gas catalytic converter in terms of the conversion of the component can then be obtained, for example, from the equation below, wherein c_end is the concentration (or contents) of the exhaust-gas component measured downstream from the catalytic converter and c_raw stands for the raw emission of the internal combustion engine regarding this component:

$$\eta = 1 - \frac{c\_end}{c\_raw}$$

The efficiency $\eta$ can thus assume values from 0 to 1. An ideally functioning catalytic converter that brings about a complete catalytic conversion (c_end=0) thus exhibits an efficiency $\eta$ of 1, whereas $\eta=0$ (c_end=c_raw) in the case of a completely inactive catalytic converter.

German patent application DE 10 2010 042 442 A1 describes an exhaust-gas system with an SCR catalytic converter as well as with a low-pressure exhaust-gas recirculation system by means of which an exhaust-gas stream is withdrawn downstream from a turbine of an exhaust-gas turbocharger (on the low-pressure side) and downstream from the SCR catalytic converter, while the combustion air of the internal combustion engine is fed in upstream from a compressor of the exhaust-gas turbocharger (on the low-pressure side). In the exhaust-gas recirculation line, there is a $NO_x$ sensor that measures the concentration of nitrogen oxides in order to regulate the internal combustion engine on the basis of the $NO_x$ concentration thus ascertained, especially the exhaust-gas recirculation (EGR) rate or the air-fuel ratio. The exhaust-gas recirculation line is also connected to the air line of the internal combustion engine via a bypass that opens up into the air line downstream from the compressor, in other words, on its high-pressure side. In order to determine an offset of the $NO_x$ sensor so that it can be calibrated, the bypass is opened, which brings about a reversal in the direction of flow in the exhaust-gas recirculation line, so that the $NO_x$ sensor is charged with fresh air. A diagnose of the SCR catalytic converter is not described here.

SUMMARY OF THE INVENTION

The invention is based on the objective of putting forward a method for the diagnosis of an exhaust-gas catalytic converter in terms of its conversion rate for an exhaust-gas component, said method standing out for its improved precision. The method should lend itself, for example, for the diagnosis of an SCR catalytic converter. The invention likewise puts forward a diagnostic device that is suitable to carry out the method, and a corresponding motor vehicle.

These objectives are achieved by means of a method for the diagnosis of an exhaust-gas catalytic converter arranged in the exhaust-gas system of an internal combustion engine as well as by a motor vehicle having the features of the independent claims.

Before this backdrop, the invention relates to an internal combustion engine having an exhaust-gas recirculation system with which a partial stream of the exhaust gas is withdrawn downstream from the exhaust-gas catalytic converter and fed into the combustion air of the internal combustion engine. The method according to the invention comprises the following features:
- determining the momentary raw emission of the internal combustion engine in terms of the exhaust-gas component;
- measuring the momentary concentration of the exhaust-gas component in the exhaust gas upstream from the exhaust-gas catalytic converter; and
- determining a diagnostic value of the exhaust-gas catalytic converter in terms of the conversion of the exhaust-gas component as a function of the modeled raw emission of the internal combustion engine and of the concentration measured in the exhaust gas.

Therefore, unlike with conventional methods, the momentary concentration of the exhaust-gas component here is not determined downstream from the exhaust-gas catalytic converter that is to be diagnosed, but rather, upstream from it. In this context, the invention makes use of the fact that the exhaust gas measured upstream from the exhaust-gas catalytic converter is also influenced by the activity of the exhaust-gas catalytic converter due to the exhaust-gas recirculation. The lower the conversion rate, the higher the concentration of the exhaust-gas component at the measuring site upstream from the exhaust-gas catalytic converter. Due to the relatively close proximity to the engine, the exhaust-gas sensor needed for measuring the exhaust-gas component achieves its operational readiness much sooner after a cold engine start-up and is thus activated sooner than a sensor located downstream from the catalytic converter; as a result, the frequency with which the diagnosis of the exhaust-gas catalytic converter is carried out is considerably increased in comparison to conventional methods. This translates into greater precision and reliability of the catalytic converter diagnosis. Moreover, the procedure according to the invention can also recognize a defective catalyst that only constitutes part of a catalytic converter system.

The measurement of the concentration of the exhaust-gas component is preferably done in a place of the exhaust-gas system that is close to the engine. This refers to any place that is upstream from an underbody place in the exhaust-gas system. In particular, the measuring point for the concentration of the exhaust-gas component is located at the maximum at a distance of 120 cm from a cylinder outlet of the internal combustion engine, preferably 100 cm at the maximum, and especially preferred 80 cm at the maximum. Since the sensor needed for the measurement is arranged close to the engine, the operational readiness of the sensor is reached much sooner after a cold start of the engine, thus allowing the catalytic converter diagnosis to be carried out very frequently.

In a preferred embodiment of the method, the efficiency of the exhaust-gas catalytic converter is determined as a diagnostic value as a function of the ratio of the modeled raw emission to the measured concentration. Especially preferably, the efficiency $\eta$ is ascertained according to the equation below, whereby $NO_x\_meas$ stands for the concentration of the exhaust-gas component measured upstream from the exhaust-gas catalytic converter, while $NO_x\_raw$ stands for the raw emission of the exhaust-gas component, and $\alpha\_EGR$ stands for the exhaust-gas recirculation rate, in other words, the portion of recirculated exhaust gas in the combustion air of the internal combustion engine:

$$\eta = 1 - \frac{\alpha\_EGR^{-1}(NO_x\_meas - NO_x\_raw)}{NO_x\_raw}$$

This equation takes into consideration the fact that the sensor arranged upstream from the exhaust-gas catalytic converter measures the sum of the engine raw emission in terms of the exhaust-gas component as well as the portion that has not been converted by the exhaust-gas catalytic converter and recirculated via the EGR.

According to an advantageous embodiment, the diagnostic value determined for the exhaust-gas catalytic converter, for instance, the efficiency $\eta$, is compared to a corresponding target value that is determined particularly for a new and completely intact exhaust-gas catalytic converter. If, in this process, a predetermined minimum deviation from the target value has been exceeded, a fault in the exhaust-gas catalytic converter is ascertained and this is output. As an alternative, the diagnostic value is compared to a corresponding threshold value and, if the threshold value has been exceeded (either upwards or downwards, depending on the type of threshold value), a fault in the exhaust-gas catalytic converter is ascertained and this is output. The fault is preferably output to an engine control unit of the internal combustion engine and/or as a visual and/or acoustic fault message to the driver. In a preferred embodiment, the threshold value and/or the target value is predetermined as a function of an operating point of the internal combustion engine, especially an engine load or engine speed. A stored characteristic map can be employed for this purpose.

The momentary raw emission of the internal combustion engine is preferably likewise modeled as a function of the momentary operating point of the internal combustion engine, whereby here, too, preferably a characteristic map can be employed. The modeled raw emission of the internal combustion engine as a function of the operating point, particularly the engine load and engine speed, constitutes such a characteristic map.

The invention also relates to a diagnostic device for diagnosing an exhaust-gas catalytic converter arranged in the exhaust-gas system of an internal combustion engine for the catalytic conversion of at least one exhaust-gas component of the internal combustion engine, whereby the diagnostic device is configured to carry out the method according to the invention. In particular, the diagnostic device comprises a computer-readable algorithm for carrying out the method as well as optionally needed characteristic lines and characteristic maps in computer-readable stored form.

The diagnostic device can be an autonomous device with its own signal lines, or else it can be integrated into an engine control unit.

The invention also relates to a motor vehicle with an internal combustion engine, an exhaust-gas system connected thereto, an exhaust-gas catalytic converter installed in the exhaust-gas system for the catalytic conversion of at least one exhaust-gas component of the internal combustion engine, an exhaust-gas sensor located upstream from the exhaust-gas catalytic converter for purposes of measuring the momentary concentration of the exhaust-gas component in the exhaust gas, an exhaust-gas recirculation system for withdrawing a partial stream of the exhaust gas downstream from the exhaust-gas catalytic converter and for feeding the withdrawn partial stream of exhaust gas into the combustion air of the internal combustion engine as well as a diagnostic device configured to carry out the method.

Preferably, the exhaust-gas catalytic converter that is to be diagnosed is a catalytic converter for the reduction of nitrogen oxides, especially a catalytic converter that functions according to the principle of selective catalytic reduction (SCR). Accordingly, the exhaust-gas component comprises nitrogen oxides $NO_x$, whereby the exhaust-gas sensor is a sensor configured to measure nitrogen oxides, especially a $NO_x$ sensor. As an alternative, however, the $NO_x$ measurement can also make use of lambda sensors which have the appropriate cross-sensitivity and which issue an appropriate output signal that correlates with the $NO_x$ concentration.

The reductant that is metered in is preferably ammonia $NH_3$ or a precursor compound thereof, whereby especially urea is an option here. The urea can be used in the form of solid urea pellets but preferably in the form of especially an aqueous solution of urea. The metered-in urea reacts via the modality of thermolysis and hydrolysis, releasing $NH_3$ in this process. Within the scope of the invention, the reductant ammonia can also fundamentally be stored by means of $NH_3$-storage materials which reversibly bind or release ammonia as a function of the temperature. Appropriate metal-ammine storage materials were already elaborated upon above.

The use of the method according to the invention for other exhaust-gas catalytic converters such as, for instance, $NO_x$-storage catalytic converter or oxidation catalytic converters, is likewise possible.

According to another preferred embodiment of the invention, the exhaust-gas after-treatment device also has an oxidation catalytic converter. This catalytic converter is preferably located upstream from the SCR catalytic converter that is to be diagnosed. In this manner, it is achieved that the ratio of $NO_2$ to NO of the exhaust gas is increased, resulting in an improved $NO_x$ conversion rate of the SCR catalytic converter located downstream. If, in addition, the oxidation catalytic converter is situated downstream from the metered-in reductant, the result is an improved homogenization of the reductant metered into the exhaust gas before it enters the SCR catalytic converter.

The internal combustion engine is an internal combustion engine that is lean-running constantly or at least at times, especially a diesel engine. Fundamentally speaking, the exhaust-gas after-treatment device according to the invention, however, can also be advantageously used for Otto engines that are lean-running at times, especially Otto engines that operate with direct gasoline injection.

BRIEF DESCRIPTION OF THE DRAWINGS

The invention will be explained in greater detail below on the basis of embodiments making reference to the accompanying drawings. The following is shown.

DETAILED DESCRIPTION OF THE INVENTION

The invention will be presented below on the basis of an example of an SCR catalytic converter. However, it goes without saying that the invention can also be employed for other exhaust-gas catalytic converters.

Figure 1:
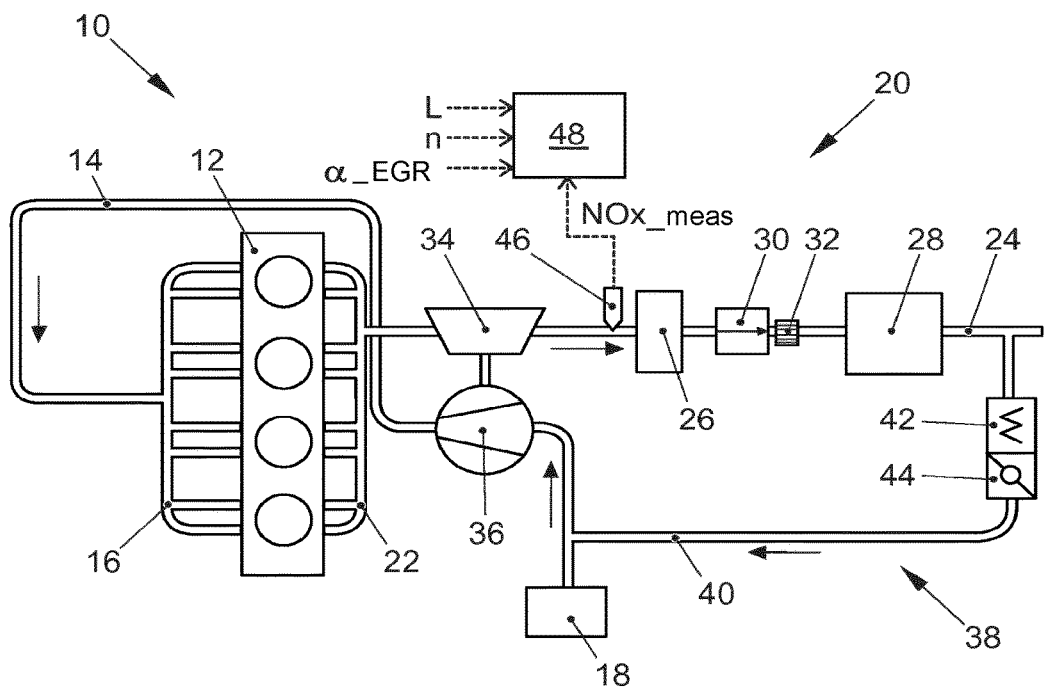
FIG. 1 a schematic view of an exhaust-gas system according to an advantageous embodiment of the invention.

FIG. 1 shows a drawing of a motor vehicle which is designated in its entirety by the reference numeral 10 and which is driven by an internal combustion engine 12 that is lean-running, at least at times, especially by a diesel engine that serves as the source of traction. The internal combustion engine 12 here has, for instance, four cylinders, whereby any number of cylinders diverging from this is likewise possible.

The internal combustion engine 12 is supplied with combustion air via an air line 14 and via an air manifold 16 that conveys the drawn-in air to the cylinders. The combustion air drawn in from the ambient air is cleaned of particulate constituents by means of an air filter 18.

The motor vehicle 10 also has an exhaust-gas system which is designated in its entirety by the reference numeral 20 and which serves for the catalytic after-treatment of exhaust gas from the internal combustion engine 12. The exhaust-gas system 20 comprises an exhaust-gas manifold 22 that connects the individual cylinder outlets of the internal combustion engine 12 to an exhaust-gas conduit 24. The exhaust-gas conduit 24 has a section (shown here) close to the engine as well as an underbody section (not shown here) that ends in the exhaust pipe. The exhaust-gas conduit 24 houses various components for the exhaust-gas after-treatment.

In the example shown, the exhaust gas first reaches an oxidation catalytic converter 26. This catalytic converter has a substrate that is coated with a catalytic coating that catalyzes the oxidation of exhaust-gas components. In particular, it is well-suited for converting unburned hydrocarbons HC and carbon monoxide CO into $CO_2$ and $H_2O$. Moreover, the catalytic coating of the oxidation catalytic converter 26 is configured to oxidize No and $N_2O$ to form $NO_2$ in order to increase the ratio of $NO_2$ to NO. The catalytic coating of the oxidation catalytic converter 26 contains as the catalytic component particularly at least one element from the group of platinum metals Pt, Pd, Rh, Ru, Os or Ir, or else a combination thereof, especially Pt and/or Pd. The catalytic coating of the oxidation catalytic converter 26 also contains a washcoat comprising a porous ceramic matrix having a large specific surface area, for example, on the basis of zeolite, which is doped with the catalytic component. The substrate of the oxidation catalytic converter 26 can be a metallic substrate or a ceramic monolith, especially a honeycomb-like structure having a plurality of continuous, parallel flow channels. Suitable ceramic materials include aluminum oxide, cordierite, mullite and silicon carbide. Suitable material substrates are made out of stainless steel or iron-chromium alloys.

Downstream from the oxidation catalytic converter 26, there is another exhaust-gas catalytic converter, here an SCR catalytic converter 28 in the exhaust-gas conduit 24. The SCR catalytic converter 28, like the oxidation catalytic converter 26, comprises a catalytic substrate on a metallic or ceramic basis, preferably on a ceramic basis. Suitable ceramic or metallic materials correspond to those mentioned in conjunction with the oxidation catalytic converter. The inner walls of the parallel and continuous flow channels of the substrate are coated with an SCR catalytic coating that brings about the reduction of nitrogen oxides to form nitrogen under selective consumption of a reductant. The coating, in turn, comprises a washcoat consisting of a porous ceramic matrix having a large specific surface area (e.g. a zeolite on an aluminum silicate basis), with catalytic substances distributed thereupon. Suitable SCR catalytic substances encompass especially non-noble metals such as Fe, Cu, Va, Cr, Mo, W as well as combinations thereof. These substances are deposited onto the zeolite and/or the zeolite metals are partially replaced by the corresponding non-noble metals through the modality of ion exchange. The SCR catalytic converter 28 is preferably arranged in a place that is close to the engine. In particular, the distance (path of the exhaust gas) between the cylinder outlet and an inlet face of the SCR catalytic converter 28 amounts to 120 cm at the maximum.

The exhaust-gas system 20 also has a reductant metering unit 30 with which the reductant or a precursor compound thereof is metered into the exhaust gas. For instance, the reductant is introduced into the exhaust-gas stream by means of a nozzle located upstream from the SCR catalytic converter 28. The reductant can typically be ammonia $NH_3$ that is metered in in the form of a precursor compound, especially in the form of urea. Preferably, the urea in the form of an aqueous solution is conveyed and metered in from a reservoir (not shown here). In a mixer 32 installed downstream from the metering unit 30, the urea is mixed with the hot exhaust gas and decomposed to form $NH_3$ and $CO_2$ through the modality of thermolysis and hydrolysis. The $NH_3$ is stored in the coating of the SCR catalytic converter 28, where it is used for the reduction of nitrogen oxides. The reductant is usually metered in via the metering unit 30 by means of a control system (not shown here) which regulates the unit 30 as a function of a given operating point of the engine 12, especially as a function of the momentary $NO_x$ concentration in the exhaust gas.

The vehicle 10 also comprises an exhaust-gas turbocharger that has a turbine 34 arranged in the exhaust-gas conduit 24, said turbine being joined, for example, by means of a shaft to a compressor 36 situated in the air line 14. The turbine 34 withdraws kinetic energy from the exhaust gas in order to drive the compressor 36 and in order to compress the drawn-in combustion air. Normally, downstream from the compressor 36, there is an intercooler (not shown here) by means of which heat that was generated by the compression is withdrawn from the combustion air.

The motor vehicle 10 also has a low-pressure exhaust-gas recirculation system (LP-EGR) 38. It has an exhaust-gas recirculation line 40 that, on the low-pressure side of the turbine 34 downstream from the SCR catalytic converter 28, withdraws a partial stream of the exhaust gas from the exhaust-gas conduit 24 and feeds it into the air line 14 on the low-pressure side of the compressor 36. An EGR cooler 42 situated in the EGR line 40 cools the hot, recirculated exhaust gas. The EGR rate, that is to say, the recirculated portion of exhaust gas in the combustion air of the internal combustion engine 12, is regulated by means of an EGR valve 44 likewise situated in the EGR line 40. Normally, the EGR valve 44 is regulated as a function of a given operating point of the internal combustion engine 12, whereby the valve 44 can be continuously varied between a completely closed position (EGR rates of zero, complete deactivation of the EGR) and a completely open position.

Like all exhaust-gas catalytic converters, the SCR catalytic converter 28 is also subject to an age-related worsening of its catalytic activity. For this reason, there is a need for an ongoing diagnosis of the SCR catalytic converter 28 in order to detect an unacceptable weakening of its catalytic activity. According to the invention, the SCR catalytic converter 28 is diagnosed by means of a $NO_x$ sensor 46 situated upstream from it. Preferably, the sensor 46 is installed upstream from the reductant metering unit 30 and especially preferably upstream from the oxidation catalytic converter 26. Since the $NO_x$ sensor 46 is arranged very close to the engine 12, it can quickly reach operational readiness after a cold start of the engine 12. An output signal $NO_x\_meas$ of the $NO_x$ sensor 46 is entered as an input quantity into a diagnostic device 48. Moreover, the diagnostic device 48 receives information about the momentary EGR rate $\alpha\_EGR$ and the momentary operating point of the internal combustion engine 12, especially in the form of the engine load L and the engine speed n. As a function of these and, if applicable, other quantities, the diagnostics device performs a diagnosis of the SCR catalytic converter 28 by means of the method according to the invention, as will be elaborated upon in greater detail below with reference to FIG. 2.

Figure 2:
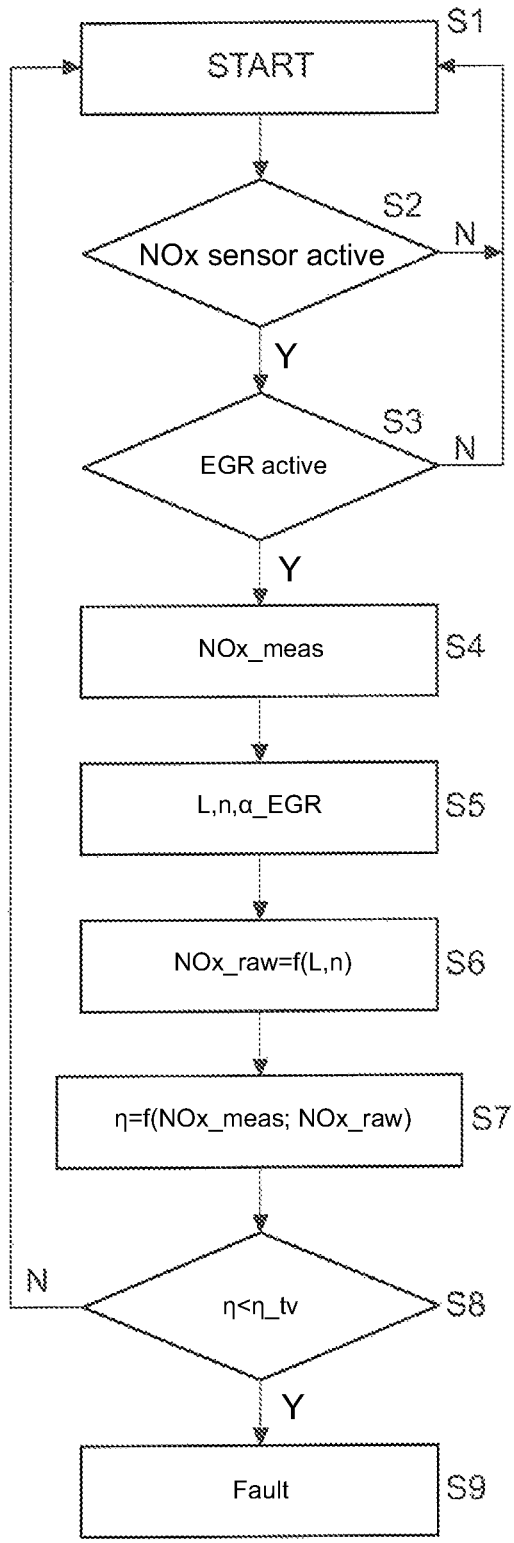
FIG. 2 a flow chart for carrying out a diagnosis of an SCR catalytic converter according to an advantageous embodiment of the invention.

By way of an example, FIG. 2 shows the sequence of the method according to the invention for the diagnosis of an SCR catalytic converter, in the form of a flow chart that is executed at regular intervals by the diagnostic device 48.

The method is initialized in step S1 and then proceeds to the query S2, which checks whether the $NO_x$ sensor 46 is active. If this is not the case, for instance, after a cold start, the diagnosis cannot be carried out and the method returns to the starting point. If, on the other hand, the $NO_x$ sensor 46 is active, that is to say, if its output signal has been activated, the method proceeds to a second query S3, which checks whether the exhaust-gas recirculation system is active, that is to say, whether the EGR valve 44 is at least partially open. If the exhaust-gas recirculation system is not active, the diagnosis cannot be carried out and the method returns to its starting point. If, in contrast, the exhaust-gas recirculation system is active, that is to say, the answer to the query in S3 is "yes", then the diagnosis of the SCR catalytic converter 28 is carried out.

For this purpose, in step S4, the diagnostic device 48 reads in the output signal of the $NO_x$ sensor 46 and, as a function of the sensor signal, determines the momentary concentration of nitrogen oxides $NO_x\_meas$ in the exhaust gas. Typically, for this purpose, a stored sensor characteristic line is employed which represents the $NO_x$ concentration as a function of the sensor signal, for instance, a sensor voltage. It goes without saying that the term "concentration" refers to any information about the content of the exhaust-gas component in the exhaust gas, irrespective of the unit used.

Subsequently, in step S5, the diagnostic device 48 reads in several input quantities. In particular, these include the engine load L, which is determined, for instance, on the basis of the gas pedal actuation by the driver, the engine speed n as well as the momentary EGR rate $\alpha\_EGR$. The momentary $NO_x$ raw emission $NO_x\_raw$ is modeled as a function of the engine load L and of the engine speed n. This can either be calculated by means of a mathematical model or else it can make use of stored characteristic lines or characteristic maps. In particular, a characteristic map is used that depicts the $NO_x$ raw emission $NO_x\_raw$ as a function of the engine load L and of the engine speed n. The determination of such characteristic maps, for example, on an engine test bench, is a known procedure and will not be elaborated upon here.

Subsequently, in step S7, a diagnostic value is determined for the SCR catalytic converter 28 in terms of its conversion of $NO_x$. In particular, an efficiency $\eta$ is calculated here, for which purpose the modeled raw emission $NO_x\_raw$ is related to the measured $NO_x$ concentration $NO_x\_meas$. For example, the efficiency $\eta$ can be determined according to the following equation:

$$\eta = 1 - \frac{\alpha\_EGR^{-1}(NO_x\_meas - NO_x\_raw)}{NO_x\_raw}$$

Subsequently, in step S8, the determined efficiency $\eta$ is compared to an efficiency threshold value $\eta\_sw$. Preferably, the threshold value $\eta\_sw$ is predetermined by the diagnostic device 48 as a function of the engine operating point (L,n). If the momentarily determined efficiency is equal to or greater than $\eta\_sw$, the answer to the query is "no", meaning that the SCR catalytic converter 28 is intact, and the method returns to the starting point. Optionally, the momentary diagnostic value $\eta$ can be stored for documentation purposes. However, if the answer to the query in step S8 is "yes", that is to say, if the efficiency $\eta$ has fallen below the threshold value then, in step S9, a fault in the catalytic converter 28 is determined. The fault can be output as a visual and/or acoustic signal to the driver of the vehicle, and/or it can be relayed to the engine control unit, from where it can be read out at the time of the next servicing.

LIST OF REFERENCE NUMERALS

10 motor vehicle
12 internal combustion engine
14 air line
16 air manifold
18 air filter
20 exhaust-gas system
22 exhaust-gas manifold
24 exhaust-gas conduit
26 oxidation catalytic converter
28 exhaust-gas catalytic converter/SCR catalytic converter
30 reductant metering unit
32 mixer
34 turbine
36 compressor
38 low-pressure exhaust-gas recirculation system
40 exhaust-gas recirculation line
42 EGR cooler
44 EGR valve
46 $NO_x$ sensor
48 diagnostic device
$\alpha\_EGR$ EGR rate (portion of exhaust gas in the combustion air)
L engine load
n engine speed
$NO_x\_meas$ measured concentration of the exhaust-gas component in the exhaust gas upstream from the exhaust-gas catalytic converter
$NO_x\_raw$ modeled raw emission of the exhaust-gas component in the internal combustion engine

The invention claimed is:

1. A method for diagnosing an exhaust-gas catalytic converter configured to catalytically convert at least one exhaust-gas component, the catalytic converter being arranged in an exhaust-gas system of an internal combustion engine having an engine control unit and an exhaust-gas recirculation system configured to withdraw a partial stream of exhaust gas downstream from the exhaust-gas catalytic converter and to feed the partial stream into combustion air of the internal combustion engine, said engine control unit configured to implement the method, the method comprising:
determining a momentary raw emission ($NO_x\_raw$) of the internal combustion engine in terms of an exhaust-gas component;
measuring a momentary concentration of the exhaust-gas component ($NO_x\_meas$) in the exhaust gas upstream from the exhaust-gas catalytic converter; and
determining a diagnostic value of the exhaust-gas catalytic converter in terms of the conversion of the exhaust-gas component as a function of a modeled raw emission ($NO_x\_raw$) of the internal combustion engine and of the measured concentration of the exhaust-gas component ($NO_x\_meas$).

2. The method according to claim 1, further comprising determining an efficiency ($\eta$) of the exhaust-gas catalytic converter as a diagnostic value as a function of the ratio of the modeled raw emission ($NO_x\_raw$) to the measured concentration ($NO_x\_meas$).

3. The method according to claim 2, wherein the efficiency ($\eta$) is determined according to the equation below, wherein $\alpha\_EGR$ stands for the exhaust-gas recirculation rate:

$$\eta = 1 - \frac{\alpha\_EGR^{-1}(NO_x\_meas - NO_x\_raw)}{NO_x\_raw}.$$

4. The method according to claim 3 further comprising:
comparing the efficiency ($\eta$) to a target value ($\eta \geq target$) or to a threshold value ($\eta\_tv$), and,
in the case of a minimum deviation from the target value ($\eta\_target$) or if the threshold value ($\eta\_tv$) has been exceeded, ascertaining a fault in the exhaust-gas catalytic converter, and
outputting the fault to the engine control unit.

5. The method according to claim 4, further comprising modeling the target value ($\eta\_target$) and/or the threshold value ($\eta\_tv$) as a function of a momentary operating point of the internal combustion engine using a characteristic map.

6. The method according to claim 5 further comprising modeling the raw emission ($NO_x\_raw$) of the internal combustion engine as a function of the momentary operating point of the internal combustion engine using a characteristic map.

7. A diagnostic device for diagnosing an exhaust-gas catalytic converter, wherein the diagnostic device comprises an engine control unit configured to:
determine a momentary raw emission ($NO_x\_raw$) of an internal combustion engine in terms of an exhaust-gas component;
measure a momentary concentration of the exhaust-gas component ($NO_x\_meas$) in an exhaust gas upstream from an exhaust-gas catalytic converter; and
determine a diagnostic value of the exhaust-gas catalytic converter in terms of the conversion of the exhaust-gas component as a function of a modeled raw emission ($NO_x\_raw$) of the internal combustion engine and of the measured concentration of the exhaust-gas component ($NO_x\_meas$).

8. A motor vehicle comprising:
an internal combustion engine,
an exhaust-gas system connected to the internal combustion engine,
an exhaust-gas catalytic converter arranged in the exhaust-gas system, said catalytic converter configured to catalytically convert at least one exhaust-gas component of the internal combustion engine, an exhaust-gas sensor located upstream from the exhaust-gas catalytic converter and configured to measure a momentary concentration of the at least one exhaust-gas component ($NO_x\_meas$) in exhaust gas, an exhaust-gas recirculation system configured to withdraw a partial stream of exhaust gas downstream from the exhaust-gas catalytic converter and to feed the withdrawn partial stream of exhaust gas into combustion air of the internal combustion engine; and the diagnostic device configured to:
- determine a momentary raw emission ($NO_x\_raw$) of the internal combustion engine in terms of the at least one exhaust-gas component;
- measure, via the exhaust-gas sensor, the momentary concentration of the at least one exhaust-gas component ($NO_x\_meas$) in the exhaust gas upstream from the exhaust-gas catalytic converter; and
- determine a diagnostic value of the exhaust-gas catalytic converter in terms of the conversion of the exhaust-gas component as a function of a modeled raw emission ($NO_x\_raw$) of the internal combustion engine and of the measured concentration of the at least one exhaust-gas component ($NO_x\_meas$).

9. The motor vehicle according to claim 8, wherein the exhaust-gas catalytic converter is configured to reduce nitrogen oxides.

10. The motor vehicle according to claim 8, wherein the at least one exhaust-gas component comprises nitrogen oxides ($NO_x$) and the exhaust-gas sensor is a $NO_x$ sensor.

11. The motor vehicle according to claim 9, wherein the catalytic converter is a SCR catalytic converter.

* * * * *